June 6, 1944.　　　　G. H. THOMPSON　　　　2,350,426
WELDING STINGER
Filed June 8, 1943
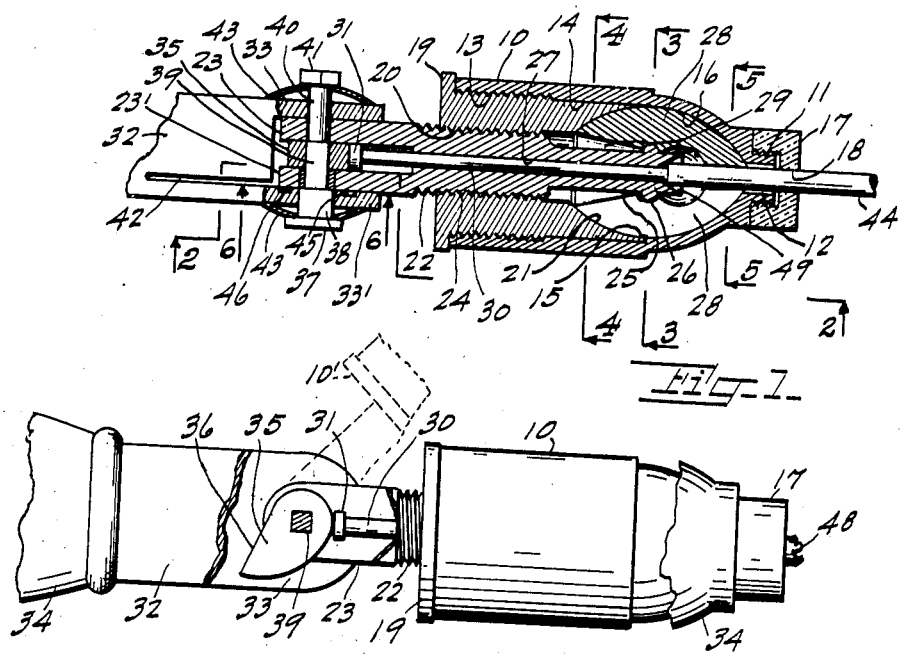
Fig. 1.
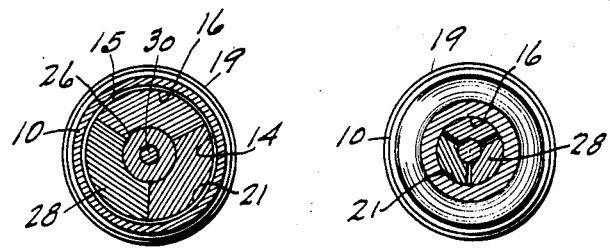
Fig. 2.
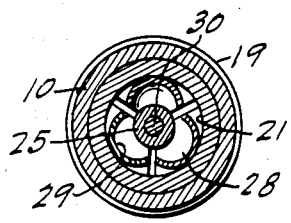
Fig. 3.
Fig. 4.
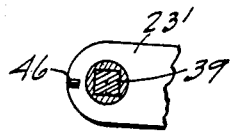
Fig. 5.
Fig. 6.
INVENTOR
George H. Thompson
By Philip A. Friedell
ATTORNEY.

Patented June 6, 1944

2,350,426

UNITED STATES PATENT OFFICE 2,350,426

WELDING STINGER

George H. Thompson, Oakland, Calif.

Application June 8, 1943, Serial No. 490,097

7 Claims. (Cl. 219—8)

This invention, a welder's stinger, sometimes referred to as an electrode holder, is an improvement over conventional stingers in that a positive chuck—one not dependent upon springs for opening the jaws—is used as the gripper for the welding rod, thereby avoiding the annealing action of the heat in the welding rod on springs as conventionally used between the jaws of drill chucks and in some types of stingers; and, in that special ejector mechanism is incorporated for positive ejection of the welding rod stub; and also, in that the rod can be adjusted and set at any desired angle relative to the handle so that the rod does not have to be bent, with the resultant cracking of the flux from the rod in the region of the bend.

In welding operations the welding rod must be tightly secured to form a substantially resistanceless path for the electric current and, for efficient and rapid welding the rod must extend at a proper angle to the handle, depending on the position of the work. With conventional stingers it is necessary to bend the rod to the proper angle, and this bending results in breaking the flux off the rod in the region of the bend.

With the loss of the flux, either a poor weld will result when the unfluxed portion is reached, or the bent portion will have to be discarded, resulting in considerable loss of rod and time. Furthermore, if the rod is used clear to the stinger, usually spatter will to a more or less degree attach the stub to the stinger at the point where the rod enters under which conditions the stub is usually difficult to remove.

With this invention all of the above objections have been overcome and the difficulties eliminated. The stinger can be adjusted to extend the rod at any angle relative to the handle, the grip and electrical connection on the rod are efficient, the rod need never be bent thus retaining the full coat of flux throughout the length of the rod, the rod stub cannot become attached to the stinger, and the stub is easily ejected by a simple movement of the chuck relative to the handle.

The objects and advantages of the invention are as follows:

First, to provide a stinger for welders which can be adjusted to extend the rod at any desired angle relative to the handle, thus eliminating the necessity of bending the rod.

Second, to provide a stinger with a refractory tip to prevent physical attachment of the stub of the rod to the stinger by either welding action or through spatter.

Third, to provide a stinger with positive acting jaws which require no springs for their release, and which through the normal adjustments of the chuck positively grip or release the rod at will.

Fourth, to provide a stinger as outlined with positive acting stub ejecting means and which is actuated by a simple movement of the chuck relative to the handle.

Fifth, to provide releasable holding means for retaining the stinger and its handle in any desired relative angular relation.

Other objects and advantages of the invention will become apparent as the following description is read on the drawing forming a part of this specification, and in which:

Fig. 1 is a longitudinal section through the invention with the handle shown fragmentarily.

Fig. 2 is a front elevation of Fig. 1, shown partly in section corresponding to a line 2—2 on Fig. 1.

Fig. 3 is a section taken on line 3—3 of Fig. 1.

Fig. 4 is a section taken on line 4—4 of Fig. 1.

Fig. 5 is a section taken on line 5—5 of Fig. 1.

Fig. 6 is a section taken on line 6—6 of Fig. 1, showing the means for retaining the chuck and handle in adjusted angular relation.

The stinger consists essentially of a chuck for gripping and holding a welding rod, a handle, and an ejector for removal of the welding rod stub at will.

The chuck includes a casing or sleeve 10 which terminates at one end in an externally threaded tip 11 having a central passage 12 large enough to take the largest diameter welding rod likely to be used, and at its other end is internally threaded as indicated at 13 continuing into a cylindrical bore 14 which terminates in a shoulder 15 and continues therefrom to form a substantially semi-ellipsoidal pocket 16 which is cylindrical in cross-section at any point, and in any longitudinal section is arcuate with the longitudinal radius considerably greater than the transverse radius.

Mounted on the tip 11 is a refractory collar or tip 17 which has a bore 18 of the proper size to admit the size of welding rod being used, this tip being removably attached as by the threads 11, so as to permit substitution of different tips for the different sizes of rods.

Secured by the threads 13 is a combination plug and cap member 19 which has an axial threaded bore 20 terminating in a pocket identical to the pocket formed in the casing but oppositely disposed so that when the plug is screwed down against the shoulder 15, the complete jaw pocket 21 is formed.

Adjustably mounted in the threaded bore 20 is a jaw actuating member 22 which has a yoke 23 formed at one end, is threaded at 24 intermediate its length to fit in the threaded bore 20, and is reduced in diameter at the other end as indicated at 25 with a collar 26 formed near the extreme end, and, an axial bore 27 is formed throughout its length opening into the space between the ears 23 and 23' of the yoke, and at its other end terminating in a conical bore to accommodate and center various rod diameters.

The jaws 28 are made to approximately the same form as the pocket 16—21 merely modified to fit within the respective ends of the pocket and around the portion 25 as indicated at 29 in Fig. 4, with the jaws at their centers having only operating clearance as indicated in Fig. 3, but having necessary clearance from the center to each end to permit their rocking movement about the ring 26, as indicated in Figs. 4 and 5.

A plunger 30 is slidable in the axial bore 27 to function as one member of the ejector and has suitable means such as a head 31 to retain it within the chuck.

The handle 32 shown fragmentary, forms the conductor for the electric current, the connections being well known in the art and therefore not being illustrated. This handle has a yoke 33 formed at one end with the ears spanning the yoke 23 on the chuck adjusting member. The handle and entire holder is suitably insulated as fragmentarily indicated at 34.

Mounted between the ears of the yoke 23 is a cam 35 fixed for movement with the handle. This may be accomplished in various ways such as by fixedly attaching the cam by some surface such as 36 to the handle or by extending an arm therefrom and pinning it to the handle neither of which is illustrated. The preferable way is illustrated in which it is fixed by a hinge pin or bolt.

This hinge bolt as illustrated has a head 37 with the portion 38 next to the head non-circular in form and being shown as square to fit in a square hole formed through the ear 33' of the handle yoke, and being reduced in cross-section but of the same shape for a sufficient length to pass through the adjacent ear 23' on the chuck adjusting member and through the cam 35 as indicated at 39 and continuing therefrom with a reduced diameter and cylindrical in form as indicated at 40 to pass through the other ears 23 and 33 and being threaded at its end to receive a nut 41. The handle is split back from one of the ears as indicated at 42 and spring washers 43 are located under the head and nut to provide friction between the ears forming the yoke of the handle and those forming the yoke of the chuck adjusting member, to hold the chuck and handle in any relative angular position.

The operation of the invention is as follows: A welding rod 44 is inserted through the tip 17 with the end seated in the cone shaped pocket 49. The sleeve 10 is manually rotated in one direction while the handle is held stationary. The sleeve 10 and plug 19 being fixed together travel on the threads 24 toward the handle and the jaws 28 are held against movement with the sleeve by the ring or collar 26, consequently the tip end of the jaws is forced inward to grip the welding rod through cooperation of the arcuate surfaces of the inside of the pocket 21 and the outside surfaces of the jaws. With the rod firmly secured, the chuck can be adjusted to any desired angular position relative to the handle and frictionally retained, though some positive retaining means can be incorporated, if desired. This positive indexing means can be made to secure the handle and chuck in certain relative positions such as indicated by the dotted figure 10' by grooving one of the ears as indicated at 45 and forming an upset somewhat like 46 in Fig. 6 on the cooperative ear.

When the rod is to be replaced, the sleeve is rotated in the opposite direction which causes the jaws to cooperate with the portion of the pocket 21 formed in the plug 19, with the other ends of the jaws cooperating with the other end of the pocket, the jaws in this adjustment being similarly held against movement with the sleeve by the collar 26, thus positively releasing the jaws from the welding rod stub 48. With the chuck released, the chuck is bent down relative to the handle viewing Fig. 2, which causes the cam 35 to ride on the head 31 of the ejector and force the ejector 30 toward the tip, forcing the stub 48 outwardly a distance dependent upon the rise of the cam; the principal consideration being to release the stub and project it forwardly so that it can easily be dropped or pulled out.

The insulating tip 17 is intended for its heat insulating properties and resistance to bonding with molten metal from the arc, which makes Alundum and similar refractory materials the most suitable, though other materials such as Bakelite would be fairly satisfactory.

With this arrangement it is possible to use the entire fluxed portion of the welding rod, since none of the flux is broken away because no bending is necessary. Perfect welding can be depended upon for the entire usable portion of the rod, the stub cannot become attached to the chuck, and the stub is easily and positively ejected by a comparatively rapid angular movement of the handle relative to the chuck, and the chuck can be adjusted to any desired angular position.

It will be understood that variations in construction and arrangement of parts, which variations are consistent with the appended claims may be resorted to without detracting from the spirit or scope of the invention, or sacrificing any of the advantages thereof.

I claim:

1. A chuck for a welder's stinger comprising; a handle; a sleeve having a chamber circular in cross-section and substantially ellipsoidal longitudinally, jaws having a form in which the respective ends fit the respective circular ends of said pocket with each jaw having an internal groove approximately midway of its length, a chuck adjusting member threadedly operable in said sleeve; a pivot connecting one end of said chuck adjusting member to said handle for relative angular adjustment; said chuck adjusting member having a collar formed at its other end fitting in said grooves in said jaws for actuation thereof through rotation of said sleeve relative to said chuck adjusting member; whereby said jaws pivot about said collar to respectively grip and release a welding rod with advance and retraction of said chuck adjusting member.

2. A structure as defined in claim 1; a bore formed axially through said chuck adjusting member and a counterbore formed from said one end; an ejector comprising a plunger operable axially in said bore and having a head fitting said counterbore; a cam rotatable on a transverse axis and mounted on said pivot and cooperatively related to said head and cooperating therewith to advance said plunger to eject the welding rod when said cam is adjusted in one direction, and to free said plunger when said cam is adjusted in the other direction.

3. A welder's stinger comprising; a chuck consisting of a sleeve having a chamber formed therein arcuate longitudinally and circular transversely and terminating at one end in a bore to receive a welding rod, and at the other end in a threaded passage; an assembly of jaws longitudinally arcuate externally with a lesser included arc than said chamber, and transversely circular with the ends having the same diameter as the ends of said chamber, and in combination forming an axial passage with an annular groove formed interiorly intermediate the ends thereof; and a threaded member adjustable in said passage and having its outer end projecting beyond the other end of said sleeve and having an annular collar formed at the inner end to fit in said groove; whereby relative adjustment of said sleeve and threaded member in respective directions will respectively force said jaws into the respective ends of said chamber to respectively grip and release a welding rod.

4. A structure as defined in claim 3; said threaded member having an axial bore terminating at the outer end in a counterbore; a plunger slidably fitting in said bore and having a head slidable in said counterbore; a handle having ears spanning the outer end of said threaded member and a pin fixed in said ears and rotatable in a transverse bore axially of the outer end of said threaded member for relative adjustment; and a cam fixed on said pin in cooperative relation to said head to engage said head and force said plunger to eject a welding rod stub when said handle and threaded member are relatively adjusted in one direction.

5. A chuck comprising; a sleeve having a rod receiving bore at one end and internally threaded at the other end; a plug having an axial threaded bore and externally threadedly fitting in said sleeve; a chamber formed within the sleeve and plug assembly, longitudinally arcuate and transversely circular; a jaw actuating member threadedly fitting said axial threaded bore and having an annular collar formed at its inner end with the outer end projecting beyond said plug for manual adjustment; and an assembly of jaws surrounding said inner end and having an annular groove receiving said annular collar and being arcuately formed longitudinally with the same radius and a lesser included arc than said chamber and with the ends having the same diameters as the respective ends of said chamber.

6. A structure as defined in claim 5; an axial bore formed through said jaw actuating member and terminating in the outer end in a counterbore; a plunger having a head and slidable in said bore and counterbore; a pin rotatable diametrically in said outer end and a cam fixed on said pin in cooperative relation to said head; and means for actuating said cam to depress said plunger to eject a rod from between said jaws.

7. A structure as defined in claim 5; an axial bore formed through said jaw actuating member and terminating in the outer end in a counterbore; and a plunger having a head and slidable in said bore and counterbore; and manually operable means associated with said jaw actuating member for depressing said plunger to eject a rod from between said jaws.

GEORGE H. THOMPSON.